H. S. MAXIM.

Carburetters.

No. 5,247. Reissued Jan. 21, 1873.

Witnesses
Chas. H. Smith
Geo. D. Walker

Inventor
Hiram S. Maxim
Lemuel W. Serrell
Atty.

AM. PHOTO-LITHOGRAPHIC CO. N.Y. (OSBORNE'S PROCESS.)

UNITED STATES PATENT OFFICE.

HIRAM S. MAXIM, OF NEW YORK, N. Y., ASSIGNOR, BY MESNE ASSIGNMENTS, TO "MAXIM GAS-MACHINE COMPANY OF NEW YORK."

IMPROVEMENT IN CARBURETERS.

Specification forming part of Letters Patent No. 81,922, dated September 8, 1868; reissue No. 5,247, dated January 21, 1873.

*To all whom it may concern:*

Be it known that I, HIRAM S. MAXIM, of the city and State of New York, have invented an Improvement in Gas-Machines, of which the following is a specification:

Before my invention gas-machines had been made in which a jet of vapor issuing from a nozzle had been employed to draw in atmospheric air and cause the same either to commingle or else to pass on through the carbureting portion of the apparatus. In the machines of this general character the relative proportion of the hydrocarbon vapor and the atmosphere is liable to vary when the number of burners is increased or lessened, because the issuing jet, being continuous, is not sufficiently rapid to supply the proper proportion of hydrocarbon vapor with a large number of burners, and when the quantity of gas consumed becomes less the issuing jet more nearly supplies the quantity consumed, and in that case the proportion of air drawn in is necessarily less. My present invention is made with especial reference to avoiding this difficulty and insuring uniformity in the proportions of hydrocarbon vapor and atmosphere, regardless of the number of burners and the speed of consumption. To effect these objects a jet of hydrocarbon vapor is employed issuing from a nozzle and drawing in atmosphere, preferably through a regulated opening, and the vapors commingle and pass into a gas-holder and cause the expansion or rising of the same, and at the maximum capacity the further issue of vapor is stopped and the jet remains closed until opened again as the gas-holder reaches its minimum capacity. In this manner, when the gas is being mixed with atmosphere, the conditions are uniform and the quantity consumed acts only to open or close the jet more or less frequently.

Figure 1:
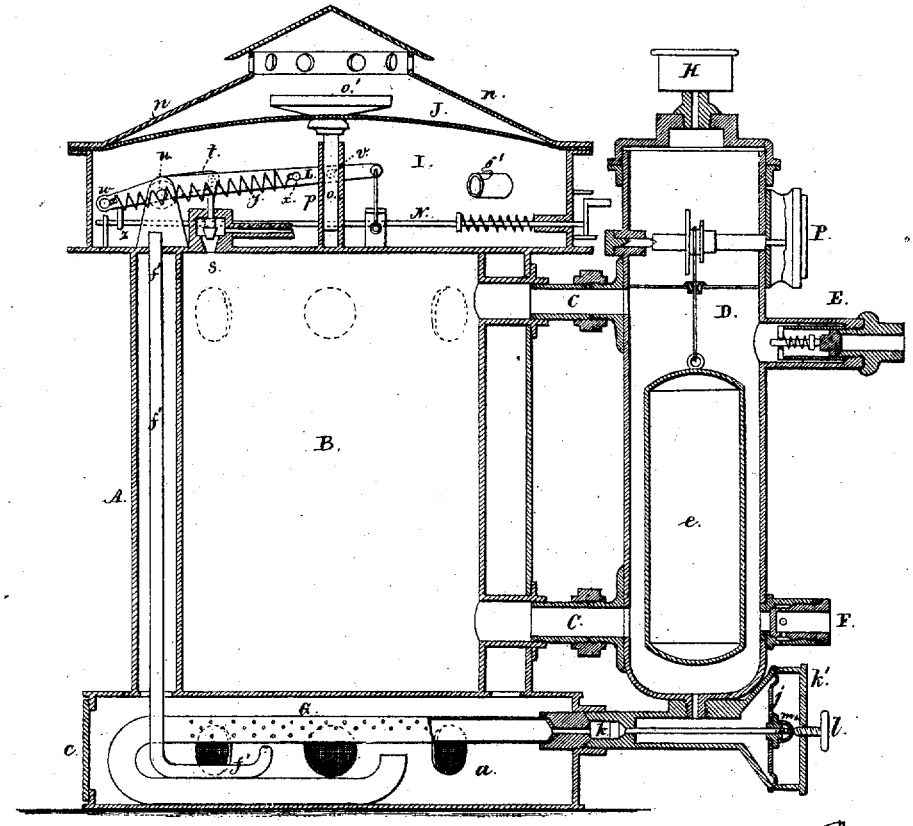
Figure 2:
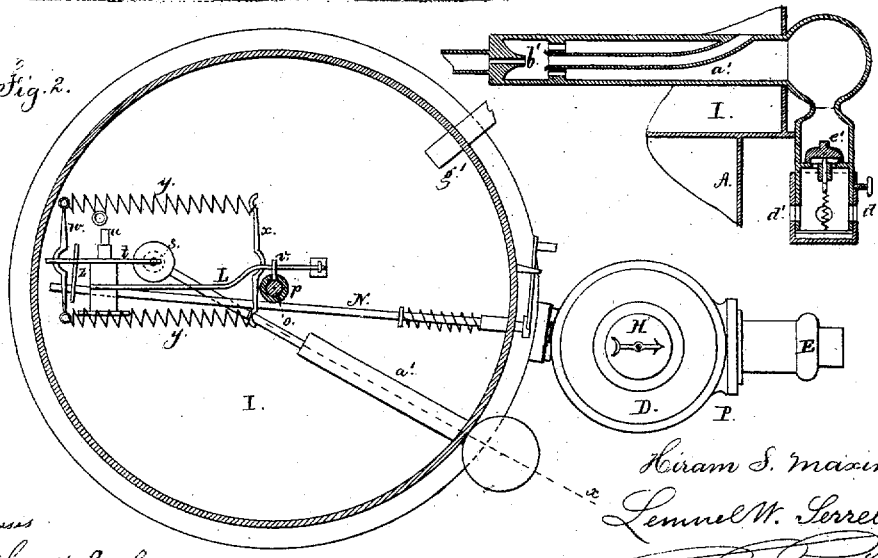
Figure 3:
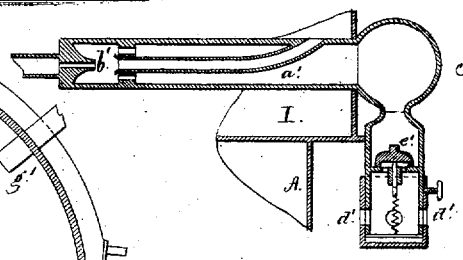

In the drawing, Figure 1 is a vertical section of the said gas-machine. Fig. 2 is a sectional plan, and Fig. 3 is a partial section at the line *x x*.

The gasoline-tank B is within the casing A, and is of suitable size. It is connected by the pipes C C with the vessel D. The liquid hydrocarbon is supplied by the pipe E, and the same is closed by a valve opening inward, or otherwise. The gaseous or liquid hydrocarbon is forced in or supplied by a pump or otherwise. The refuse material may be withdrawn at F, where a screw-plug or other suitable device is provided. The float *e* in the vessel D operates an indicator at P, to show the height of the liquid. Heat is applied in the chamber *a* below the vessel B, and in the annular chamber around the vessel B. A door at C gives access to the burners employed to heat the liquid hydrocarbon. The tube *f'* extends down from the gas-holder hereafter named, and at the end is a small jet that burns constantly and acts to ignite the liquid or gaseous hydrocarbon that is supplied by the perforated pipe G. At *j* there is a spring-diaphragm that is at the end of the pipe G and exposed to the pressure that exists in the vessels D and B, and connected to this diaphragm *j* is a valve, *k*. The diaphragm is inclosed by the cap *k'*, through which is a set-screw, *l*, to regulate the extent of movement of the diaphragm and prevent its being strained by overpressure. A nut, *m*, serves to adjust the length of the valve-rod. When pressure in B increases the valve *k* is closed to stop the supply of gas or liquid hydrocarbon to the burner G, and when the pressure decreases sufficiently the valve *k* is opened by the action of the diaphragm, and the heat augmented by the supply of combustible material. The pressure-gage H indicates the pressure in the vessels B D. The hydrocarbon gas or vapor is allowed to escape from the generator B at the valve *s*, and issue from a jet pipe or nozzle, *b'*, through a mixing-tube, *a'*, (see Fig. 3,) and issue into the gas-holder I. In its passage the issuing jet draws in atmospheric air through the tube *a'*, valve *e'*, and openings *d'*, and the size of the openings *d'* may be varied by an adjusting slide or register.

It is to be understood that when the gas-holder is filled to its maximum capacity the valve *s* is entirely closed, and so remains until the gas-holder is again filled. In this manner the proportion of hydrocarbon vapor or gas and atmosphere is rendered very uniform, because the issuing jet is fully operative at a nearly uniform pressure, and hence draws in the regulated and proper proportion of air to mix with itself, and the gas-holder is filled in nearly a uniform time; but it is emptied with greater or less rapidity, according to the number of burners that are supplied therefrom.

I have represented the gas-holder I upon the generator B, but it may be of any desired character. The pipe $g'$ is the exit or connection to the gas-pipes, and the top of the gas-holder is represented as a flexible diaphragm, J, confined at its edges and protected by a cover, $n$. There should be a weight, $o'$, to give the required pressure and operate the valve $s$. The stem $o$, sliding in a support, $p$, gives motion to the valve $s$. Two levers, L and $t$, are upon a pivot at $u$ that is suitably supported. These levers, however, are entirely independent of each other. The lever L is moved up and down by a connection, $v$, to the sliding stem $o$, so that it is raised and lowered by and with the diaphragm or top of the gas-holder. The lever $t$ is connected to the valve $s$. Cross-bars or yokes $w$ and $x$ upon these levers L and $t$ are connected at their ends by the contractile springs $y$. It will be evident that when the lever L is moved down until the yoke $x$ passes below the line of centers through the pivot $u$ the contraction of the springs moves the lever $t$, opening the valve $s$, and that these springs hold the valve open until the yoke $x$ passes above the line of centers, when the contraction of the springs moves the lever the other way and closes the valve $s$, arresting the further issue of gas or vapor from the jet $b'$ until the valve is again opened, as before. The rod N is provided at one end with a handle and at the other end with a cam, $z$, near the lever $t$, so that the cam can be used to block the lever $t$ and keep the valve $s$ closed upon its seat when the apparatus is not in use.

I claim as my invention—

1. A gas-holder, a tube supplying hydrocarbon vapors, an air-inlet, a valve and automatic mechanism operated by the moving portion of the gas-holder for opening said valve fully when illuminating-gas is required in the holder, and closing the same entirely when the requisite supply has passed to the holder, substantially as set forth.

2. A valve actuated automatically, substantially as specified, in combination with the jet-nozzle, air-induction openings, and mixing-tube, substantially as set forth.

3. A hydrocarbon vapor-generating apparatus heated by artificial heat, a connection to the liquid hydrocarbon supply, a jet-nozzle, a mixing-tube, and a gas-holder, in combination with an automatic valve and a connection to the moving portion of the gas-holder to entirely open or close the valve with rapidity, substantially as set forth.

4. A gas-generator heated by a portion of its own contents, in combination with an automatic intermitting valve and an atmospheric induction, substantially as set forth, for mixing hydrocarbon vapor and atmosphere with uniformity, regardless of the quantity of illuminating-gas that is being consumed, as specified.

5. The cylinder $e$ connected with the inclosed tank D, to show the height and pressure of the contents of the tank, and to convey part of them to the heating-chamber, as specified.

6. The combination with each other of the four separate vessels A, B, D, and I, the latter having the elastic diaphragm J stretched across it, substantially as herein shown and described.

7. The device for automatically operating the valve $s$, which regulates the flow of gas into the gas-holder I, said device consisting of the diaphragm J, pin $o$, lever L, lever $t$, arms $w$ $x$, and springs $y$, all arranged, combined, and operating substantially as herein shown and described.

8. The cam $z$ for keeping the valve $s$ closed, as set forth.

9. The pipe $f'$ for conducting illuminating-gas from the gas-holder I to the heating-chamber $a$, substantially as and for the purposes herein shown and described.

Signed by me this 14th day of November, A. D. 1872.

HIRAM S. MAXIM.

Witnesses:
GEO. T. PINCKNEY,
CHAS. H. SMITH.